United States Patent
Do

(10) Patent No.: US 6,389,037 B1
(45) Date of Patent: May 14, 2002

(54) ARRANGEMENT FOR IMPROVING THE ARCHITECTURE OF MOBILE COMMUNICATION SYSTEMS

(75) Inventor: Thanh Van Do, Oslo (NO)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/413,217

(22) Filed: Oct. 5, 1999

Related U.S. Application Data

(63) Continuation of application No. PCT/NO98/00105, filed on Apr. 2, 1998.

(30) Foreign Application Priority Data

Apr. 8, 1997 (NO) .................................................. 971605

(51) Int. Cl.[7] .............................. H04J 3/16; H04J 3/22
(52) U.S. Cl. ......................... 370/469; 370/401; 713/152
(58) Field of Search ............................... 370/469, 465, 370/466, 467, 313, 30, 335, 336, 328, 235, 231, 254, 277, 386, 400, 401; 455/403, 422; 713/151, 152

(56) References Cited

U.S. PATENT DOCUMENTS

| | | | | |
|---|---|---|---|---|
| 5,657,390 A | * | 8/1997 | Elgamal et al. | 713/151 |
| 5,822,314 A | * | 10/1998 | Chater-Lea | 370/337 |
| 5,825,759 A | * | 10/1998 | Liu | 370/331 |
| 5,841,764 A | * | 11/1998 | Roderique et al. | 370/310 |
| 5,903,568 A | * | 5/1999 | Tanaka et al. | 370/469 |
| 5,937,345 A | * | 8/1999 | McGowan et al. | 455/410 |
| 5,946,634 A | * | 8/1999 | Korpela | 455/552 |
| 6,044,065 A | * | 3/2000 | Andersson et al. | 370/251 |

FOREIGN PATENT DOCUMENTS

| EP | 0 524 077 A1 | 1/1993 |
|---|---|---|
| WO | 95/35611 A2 | 12/1995 |

OTHER PUBLICATIONS

Proceedings of the Thirtieth Annual Hawaii International Conference, vol. 1, Jan. 1997, M. Khayrat Durmosch et al., pp. 92–99, "The Tanagram DPE—A Distributed Processing Environment in a Heterogeneous Corba 2 World".

* cited by examiner

*Primary Examiner*—Dang Ton
*Assistant Examiner*—Brian Nguyen
(74) *Attorney, Agent, or Firm*—Nixon & Vanderhye P.C.

(57) ABSTRACT

The present invention relates to an arrangement for improving the architecture of mobile communication systems, especially a telecommunications system, said system comprising distributed hardware and software components which interact in order to provide services to one or more users, and according to a main aspect of the present invention, this improvement is realized by letting said arrangement comprise a mobility layer grouping all the mobility mechanisms and functions. More specifically the present invention defines a functional separation architecture for supporting mobility in communication systems.

6 Claims, 1 Drawing Sheet

The Functional Separation Architecture supporting mobility

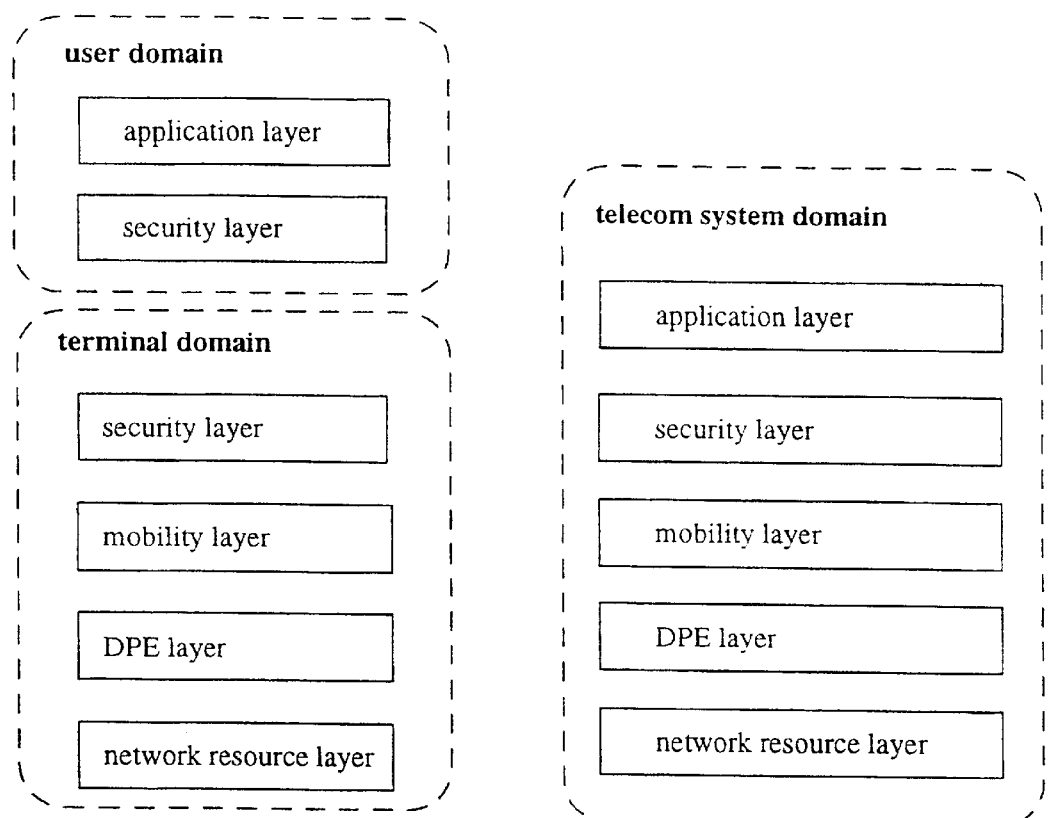
Figure 1   The Functional Separation Architecture supporting mobility

ARRANGEMENT FOR IMPROVING THE ARCHITECTURE OF MOBILE COMMUNICATION SYSTEMS

This is a continuation of PCT application No. PCT/NO98/00105, filed Apr. 2, 1998, the entire content of which is hereby incorporated by reference in this application.

FIELD OF THE INVENTION

The present invention relates to an arrangement for improving the architecture of communication systems supporting mobility.

More specifically the present invention relates to a functional separation architecture supporting mobility.

BACKGROUND OF THE INVENTION

The present invention has been developed in connection with improving the architecture of a mobile communication system.

More specifically the present invention has been developed in order to introduce mobility, i.e. the capability to deliver telecommunication services to the user anywhere and at any time, to a communication system in a well-structured way.

The present invention demonstrates that the mobility functions can be realised as a functional separated layer.

In other words, this invention proposes a function separation architecture for communication systems that supports mobility.

STATE OF THE ART

TINA (Telecommunication Information Networking Architecture) Consortium [TIN95i] has proposed a functional separation architecture for telecommunication systems but the proposed architecture does not have any mobility layer. It is unclear where the functions to support mobility are allocated (i.e. in the DPE layer or the network resource layer). Furthermore, TINA architecture does no consider three domains namely the user domain, the terminal domain and the telecom system domain.

PROBLEMS RELATED TO PRIOR ART

The existing communication system architectures do not consider mobility as separate layer but either allocate the mobility functions in the Network resource layer or the application/service layer. There are several consequences for the first case where the mobility functions are integrated on the network resource layer such as in GSM (Global Mobile System). It is difficult to make any modification of the mobility functions without affecting the network functions. It is difficult o reuse the mobility functions designed for a network on another one since they are tight to the network characteristics and technology. In the second case where mobility is treated as a service such in UPT (Universal Personal Telecommunication), the most severe disadvantage is the feature interaction which occurs due to multiple mobility implementations at different places, e.g. in fixed network and also in the mobile network.

OBJECTS OF THE INVENTION

The object of the present invention is to propose a functional separation architecture for the telecommunication system in question, whereby mobility is supported in a far more efficient and economic manner.

Another object of the present invention is to dedicate a functional layer to mobility functions and mechanisms.

Still another object of the present invention is to introduce such mobility support in any open distributed processing (ODP) system or similar.

SUMMARY OF THE INVENTION

The above objects are achieved in an arrangement as suggested by the present invention, the characterizing features thereof being defined in the appending patent claims.

In other words, according to the present invention there is suggested a functional separation architecture supporting mobility for communication systems.

More specifically such an architecture may comprise a separate functional layer for mobility, called mobility layer, in addition to the network resource layer, the DPE layer and the application layer.

Appropriately, such an architecture may comprise three domains, i.e. the user domain, the terminal domain and the telecom system domain.

Further features and advantages of the resent invention will appear from the following description taken in conjunction with the enclosed drawing, as well as from the appending patent claims.

BRIEF DISCLOSURE OF THE DRAWING

FIG. 1 is a block diagram illustrating the functional separation architecture supporting mobility, as defined in accordance with an embodiment of the present invention.

DETAILED DESCRIPTION OF EMBODIMENTS

In the following there will be given a description of embodiments which can be implemented In accordance with the present invention.

FIG. 1 illustrates in a schematical manner a first embodiment of a functional separation architecture according to the present invention, which functional separation architecture comprises appropriate mobility layers supporting and facilitating the mobility of the associated communications system.

The whole communication system consisting of users, terminals and telecommunications system is represented by a model consisting of three domains: user domain, terminal domain and telecom system domain.

In each domain, functions are grouped according to their nature into functional layers. These layers do not imply any hierarchical relationship but only a functional separation. An object in any layer can interact directly with any object in any other layer via offered interfaces.

In the telecom system domain, we have defined five functional layers: Network resource layer, DPE (Distributed Processing Environment) layer, Mobility layer, Security layer and Application layer.

The network resource layer comprises the objects controlling/managing the transport network which is used in the establishment and release of stream flows.

The DPE layer comprises objects of the distributed computing infrastructure which implement the distribution transparencies. The DPE layer provides various DPE services to the applications.

The mobility layer comprises the objects which enable the support of mobility.

The security layer comprises objects which are dealing with security issues.

The application layer comprises the objects which make use of the functions offered by other layers to provide services to users.

The objects in the different layers communicate internally in the layer as well as with objects in the other layers. The distinction between the application layer and the network resource layer reflects the call and connection separation principle introduced by the IN (Intelligent Network) architecture. Objects in the network resource layer use services from the DPE layer. Reciprocally, the DPE layer can optionally use the network resource layer to establish a bearer for the kernel transport network (kTN). The mobility layer uses services from the DPE layer, the network resource layer and the security layer. The security layer uses services from the DPE layer and the network resource layer. Finally, the application layer may use all other layers to realise its functions.

It is worth noting what TINA-C defines only three layers: network resource layer, DPE layer and service layer [TIN95e]. The architecture presented here car be considered as an enhancement of the TINA architecture.

In the terminal domain, there are four functional layers corresponding to the ones in the telecom system domain: network resource layer, DPE layer, mobility layer and security layer. The reason that there is no application layer in the terminal domain is because we choose to associate the usage of a terminal with a user.

In the user domain, there are two functional layers: security layer and application layer. The security layer comprises objects which assist the user in the security procedures such as authentication.

It is worth noting that in order to communicate with the telecom system domain, the user domain always requires a terminal domain. In fact, the domain partitioning here is an administrative one which does not correspond to a technological one. Technologically, the two domains may be unified onto one domain. However, the analysis is independent of whether or no these domains are separate technology domains. Application objects of the user domain are running on the terminal domain. The relationship between the user domain layers and the terminal domain layers is therefore similar to the relationship between layers of the same domain. Objects in the application layer of the user domain may use all the layers of the terminal domain.

The relationship between the user domain layers and the telecom system domain layers and the relationship between the terminal domain layers and the telecom system domain layers are of peer-to-peer type, e.g. terminal domain network resource layer may communicate telecom system domain network resource layer, etc.

MERITS OF THE INVENTION

The proposed Functional Separation Architecture yields a high level of modularity and flexibility. The layers are autonomous and can be designed and implemented separately. Any internal changes in one layer does not affect the other layers as long as its interfaces remain unchanged.

Another major advantage is the reuse possibility of the mobility layer in different communications using different network technologies such as GSM, DECT, etc.

Last but not least, by considering the user domain separately of the terminal domain, the architecture also covers the case where one user is using several terminals and the case where several users are sharing the same terminal.

REFERENCES

[TIN95e] TINA-C. Domain types and basic Reference Points in TINA, May 1995.

[TIN95i] TINA-C. Overall Concepts and Principles of TINA, February 1995.

What is claimed is:

1. Architecture arrangement of a mobile telecommunication system, said system comprising:

distributed hardware and software components which interact in order to provide services to one or more users, said arrangement being supported by a functional separation architecture wherein mobility functions are separated from both an associated network layer and an associated application or service layer, said mobility functions being grouped into a specific layer called a mobility layer, said mobility functions being enabled by objects contained in said mobility layer where said objects communicate internally in said mobility layer as well as with objects contained on other layers, wherein said functional separation architecture is represented by a model comprising a plurality of domains, specifically three domains including a user domain, a terminal domain and a telecom system domain;

wherein in the telecom system domain there are defined the mobility layer in addition to a network resource layer, a DPE (Distributed Processing Environment) layer, a security layer and the application layer, and wherein the mobility layer comprises objects enabling support of mobility;

wherein in the terminal domain there are defined the mobility layer in addition to the network resource layer, a DPE layer and a security layer, the application layer being associated with the usage of a terminal; and wherein the user domain is organized in at least an application layer and a security layer, and wherein the application layer in the user domain communicates with the application layer in terminal domain and the application layer in the telecom system domain.

2. Arrangement as claimed in claim 1, wherein an object in any layer can interact directly with any object in another layer via offered interfaces.

3. Arrangement as claimed in claim 1, wherein the mobility layer is adapted to use services from the DPE layer, the network resource layer, the security layer, and the application layer.

4. Arrangement as claimed in claim 1, wherein in the user domain there are defined two functional layers comprising a security layer and the application layer.

5. Arrangement as claimed in claim 1, wherein the user domain and the terminal domain are separated administratively, but are adapted to be technologically unified into one domain.

6. Arrangement as claimed in claim 1, wherein a relationship between layers in any domain is of a peer-to-peer type where a terminal domain network resource layer is able to communicate with a telecom system domain network resource layer.

* * * * *